March 23, 1926.

P. S. MOYER

AIR CONDITIONING MEANS

Filed August 18, 1922. 2 Sheets-Sheet 1

Inventor
Paul S. Moyer.
by Emery, Booth, Janney & Varney
Attys

March 23, 1926.

P. S. MOYER

AIR CONDITIONING MEANS

Filed August 18, 1922    2 Sheets-Sheet 2

1,577,867

Inventor:
Paul S. Moyer.
by Emery, Booth, Janney & Varney  Atty's.

Patented Mar. 23, 1926.

1,577,867

UNITED STATES PATENT OFFICE.

PAUL S. MOYER, OF CHICAGO, ILLINOIS, ASSIGNOR TO THE ARIDOR COMPANY, OF CHICAGO, ILLINOIS, A CORPORATION OF ILLINOIS.

AIR-CONDITIONING MEANS.

Application filed August 18, 1922. Serial No. 582,791.

*To all whom it may concern:*

Be it known that I, PAUL S. MOYER, a citizen of the United States, and a resident of Chicago, in the county of Cook and State of Illinois, have invented an Improvement in Air-Conditioning Means, of which the following is a specification.

This invention relates to air conditioning means and particularly to means for cooling and dehydrating the air of containers, and is particularly adaptable to containers for food products and the like, such, for example, as show cases, where the contents of such container may be preserved in a fresh and palatable condition and displayed in a pleasing and attractive manner.

Among other objects the invention is intended to provide means whereby the air of a show case or other container may be cooled and the moisture removed therefrom, and, wherein the relative position of cooling and dehydrating units is conductive to increased circulation of the air within the container.

The specific device selected for illustrative purposes is adapted to be placed within a show case containing confections, meats or other food products subject to deterioration due to heat and moisture.

The illustrative device may be placed within a container, preferably near the top where the circulation of the air, under ordinary conditions, is most pronounced.

It is well known that mere refrigeration in hot weather is not altogether satisfactory, inasmuch as many food products are sensitive to changes of temperature and also to changes of the moisture content of the air caused by opening and closing a show case or the like, such opening and closing often resulting in condensation of the moisture, and producing a condition which causes the products to deteriorate very rapidly. Furthermore, it is well known that food products may be better preserved in moving air than in dead or non-circulating air.

It is therefore obvious that a means for cooling, drying and circulating the air of a container is most desirable.

These results are most satisfactorily obtained by a device such as hereinafter described and illustrated in the accompanying drawings, in which cooling and dehydrating elements are so arranged as to increase the movement of the air which brings the warm and moist air into contact with the said elements and removes the cool and dry air from their vicinity.

One illustrative device embodying the present invention is shown in the accompanying drawings in which:—

Figure 1:
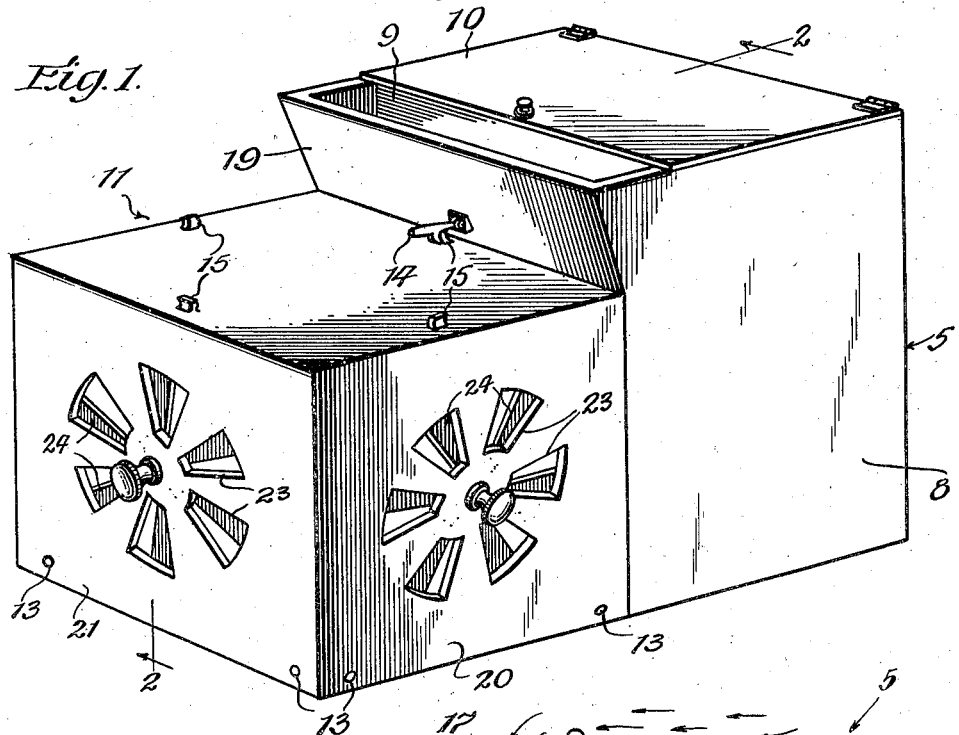
Fig. 1 is a perspective view of the device.

A means for cooling the air of a container may comprise a receptacle or housing 5 adapted to contain ice or other cooling medium.

To restrict the radiation of the low temperature generated by the cooling medium within the receptacle, the bottom 6, side wall 7 and end walls 8 of the receptacle may be insulated by an air chamber or otherwise, while the wall 9 and top or cover 10 may be constructed of relatively thin sheet metal or the like, capable of transmitting or conducting the relatively low temperature generated within the container to the exterior thereof, thereby providing a zone of cool air adjacent said wall 9 and cover 10.

To dehydrate or remove the moisture from the air of a container, a housing 11, capable of being open to the circulation of air in the container, may be provided with hygroscopic material capable of attracting and absorbing the moisture from the air as it circulates through said housing.

The housing 11 may be mounted, removably, on the side of the receptacle 5 adjacent the wall 9 by dowel pins 12 on the side of the receptacle entering the recesses 13 in the housing 11, and may be secured releasably in position by a latch 14 adapted to engage the lugs 15 formed on the top of the housing.

To insure circulation of the air past the cooling surfaces of the receptacle 5, an air duct 16 is formed between said receptacle and the housing 11, the said duct comprising the wall 9, one side of the housing 11 and the end walls 17 formed preferably integral with the receptacle 5 and, in effect, constituting extensions of the end walls 8. The bottom or lower side of the duct may comprise a portion 18 forming preferably an extension of the bottom member 6 of the receptacle.

To increase the roll or movement of circulation, the air duct 16 may be extended to the top of the receptacle 5 by the wall 19 connecting the end walls 17, and may be formed with an opening of greater area at its top than at its portion between the receptacle 5 and housing 11.

To provide for and to control the circulation of air through the housing 11, the walls 20, 21 and 22 thereof may be formed with apertures 23, the area of which may be determined by shutters 24 rotatably mounted in said walls, the blades of said shutters being adapted to overlie and vary the size of the openings through said walls or, if desired, to occupy the space between said apertures.

The sides of the housing 11 may be interchangeably connectable to the cooling side of the receptacle 5, there being a series of recesses 13 in each side of the housing adapted to receive the dowel pins 12 positioned on the side of the receptacle 5, and also a plurality of lugs 15 on the top of the housing near its side walls and adapted to be engaged by the latch 14 pivotally mounted on the wall 19.

One or more of the walls of the housing 11, for example the wall 25, may be hinged or otherwise removably secured to the housing, and, if desired, may be provided with apertures and a shutter as are the walls 20, 21 and 22.

Figure 2:
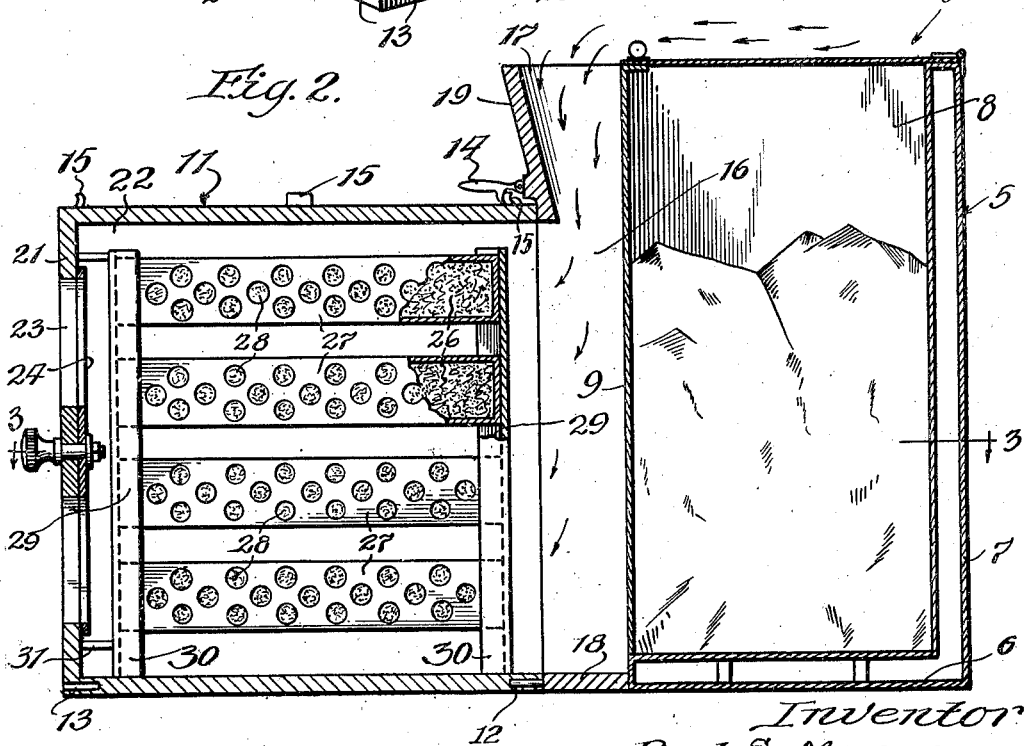
Fig. 2 is a sectional elevation taken on the line 2—2 of Fig. 1.
Figure 3:
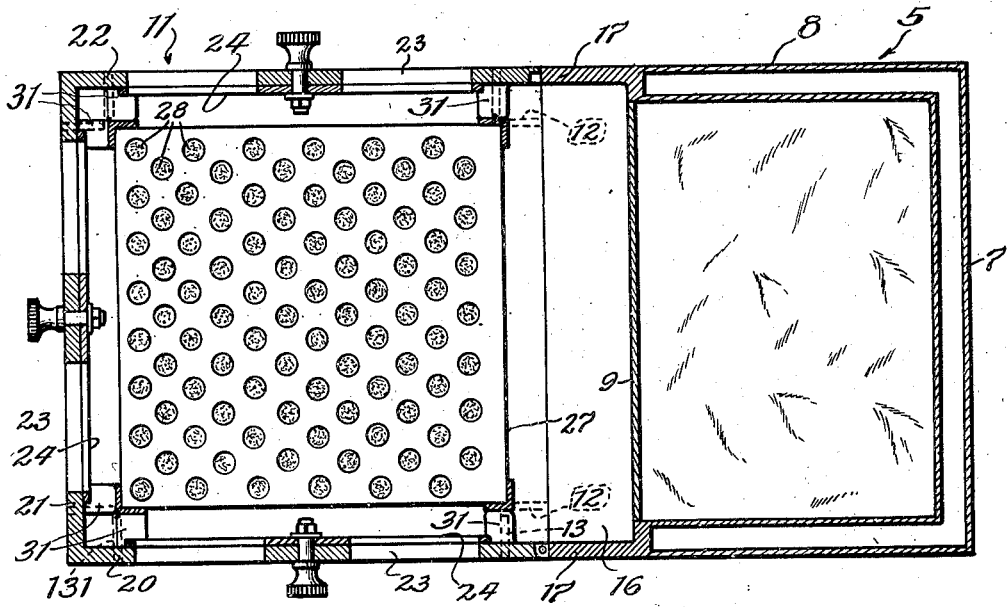
Fig. 3 is a plan section taken on the line 3—3 of Fig. 2.
Figure 4:
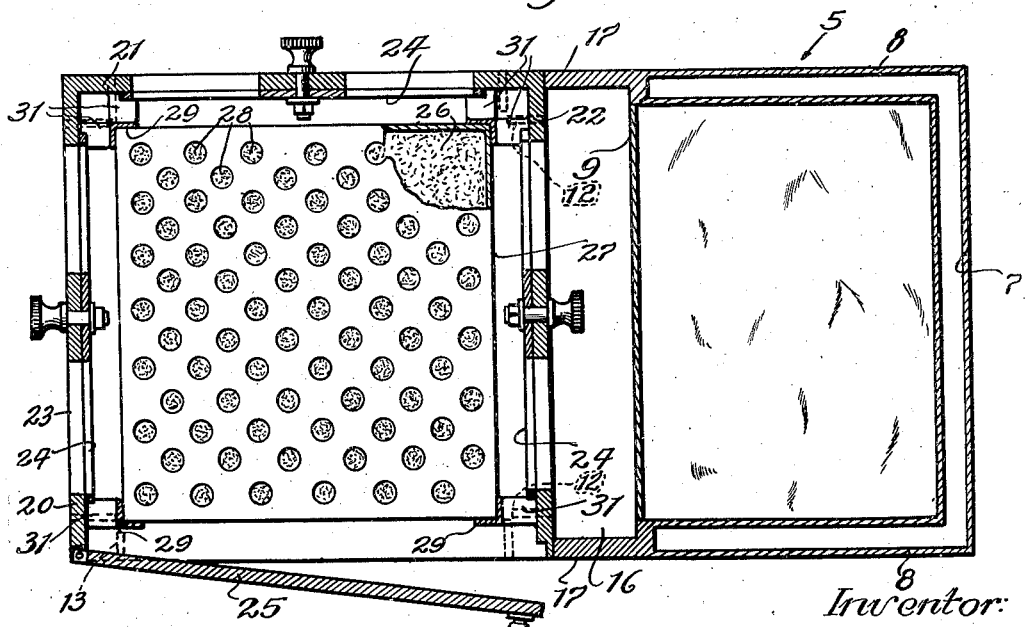
Fig. 4 is a view similar to Fig. 3 illustrating a slightly different arrangement of the dehydrating element with respect to the cooling element.

Thus it will be observed that various means have been provided for varying and controlling extensively the passage of air through the air duct 16 and housing 11. For example, the wall 25 may be removed and that side of the housing positioned adjacent the receptacle 5, as shown in Figs. 1, 2 and 3, or one of the sides 20, 21 or 22 may be positioned adjacent the receptacle and the wall 25 placed in position on the housing as shown in Fig. 4. or may be left off or partially open as desired.

To dehydrate or remove the moisture from the air of the container, as above stated, the housing 11 may be provided with a hygroscopic or moisture absorbing material which may be in the form of cakes or pads 26, confined in casings or covered trays 27.

These pads or cakes may comprise the baked product of a pasty or semi-fluid mixture of hygroscopic material capable of attracting moisture, and suitable body material capable of absorbing and storing the moisture so attracted, such, for example, as is described and claimed in my application for Letters Patent on improvements in air conditioning method and means for food containers, filed August 18, 1922, Serial No. 582,790.

In the illustrative arrangement, there is a plurality of these pads and casings spaced apart from each other to permit of the circulation of air therebetween, the side walls, top and bottom of the casings being provided with perforations 28 to permit the moisture-laden air to circulate therethrough and come in contact with the hygroscopic pads or cakes for the purpose of extracting the moisture from the air before it passes to the exterior of the housing 11.

After the pads or cakes have taken on their full capacity of moisture from the air, they may be removed from the housing 11, and restored to their hygroscopic condition by baking, or otherwise removing the moisture therefrom.

To facilitate the removal of the pads, for the purpose of restoring their hygroscopic condition, the casings or trays 27, as in the present instance, may be mounted on and supported by a plurality of uprights 29 having leg portions 30 at their lower ends for positioning the lowermost casing or tray a distance above the floor of the housing 11 to provide for the circulation of air.

It is most desirable that the pads, together with their supporting frames, be positioned within the housing 11 so as to provide substantially uniform air space on all sides of the pads to permit of the free circulation of the air and the ready removal of the moisture therefrom.

To facilitate the positioning of the pads and their supporting frame within the housing 11, there may be provided, as in the present instance, on the inner faces of the walls 20, 21 and 22 a series of lugs 31, so proportioned and positioned that when the pad supporting frame is inserted through the open side of the housing and into engagement with said lugs, the frame and pads will occupy a central position within the housing with a substantially uniform space therearound for the circulation of air.

It is a well known fact that as the temperature of air is raised it expands and consequently a unit volume decreases in weight; in other words, warm air is lighter than cold air and consequently by locally changing the temperature of air a circulation is induced, the warm air traveling upwardly and the cold air downwardly.

As air has a definite moisture capacity for each temperature, the ratio of the moisture actually contained in air compared to its moisture capacity is termed relative humidity, and it is a known fact that as the temperature of air is lowered the moisture capacity of the air is decreased.

Therefore, if air of a definite relative humidity is cooled, the relative humidity increases and when this value reaches one hundred per cent, the dew point is reached and further cooling will cause the moisture to be condensed, it is therefore obvious that as the cooling of the air increases its saturation the more easily the moisture can be removed.

From a consideration of the device, as above described, and the facts as stated, it will be observed that in the illustrative arrangement, the cooling receptacle 5 sets up a local zone of low temperature adjacent its wall 9 and top 10, and, as the circulating air comes in contact with these faces, the air becomes heavier and the relative humidity is raised.

The increase in weight, thus obtained, causes the air to travel downwardly through the duct 16 between the receptacle 5 and the housing 11 and into contact with the hygroscopic material in said housing, and, by virtue of the increased saturation, a larger amount of moisture is removed than would be of the case if the air were not cooled.

The cool, dry air leaves the housing 11 through the apertures 23 and comes in contact with the warmer and more moist air of the container, absorbs the moisture and heat therefrom and in so doing cools more air, rises to the top of its confinement and circulates again as above described.

Obviously, the present invention is not limited to the particular construction and arrangement shown but may be variously modified. Moreover, it is not essential that all the features of the invention be used conjointly, as they may be used to advantage in variously different combinations and subcombinations.

Having thus described my invention, I claim:—

1. A device of the class described comprising, in combination an ice receptacle having cooling surfaces; a housing having apertures in its side walls, certain of said walls being removable; means for interchangeably connecting the sides of said housing with said receptacle in a manner to form an air duct therebetween and adjacent one of said cooling surfaces; dehydrating material within said housing; a support therefor; means for centering said support within said housing; and means rotatably mounted on said side walls and cooperable with said apertures to vary the area thereof for controlling the passage of air through said duct and housing.

2. A device of the class described comprising, in combination, an ice receptacle having cooling surfaces; a housing having its sides interchangeably connectable with said receptacle to form an air duct between said receptacle and said housing and communicating with the interior of the latter, certain of said sides being removable; dehydrating material within said housing; and air throttling means in the walls of said housing for controlling the passage of air through said duct and housing.

3. A device of the class described comprising, in combination, an ice receptable having cooling surfaces; a housing having its sides interchangeably connectable with said receptacle in a manner to form an air duct adjacent one of said cooling surfaces and communicating with the interior of said housing; dehydrating material within the said housing; an air throttling means in the sides of said housing for controlling the passage of air therethrough.

4. A device of the class described comprising, in combination, an ice receptacle provided with cooling surfaces; a housing provided with dehydrating means and removably connectable with said receptacle adjacent one of said cooling surfaces in a manner to form an air duct, said duct being adapted to communicate with said housing and said dehydrating means, and air throttling means in the walls of said housing for controlling the circulation of air through said duct and housing.

5. A device of the class described comprising, in combination, a receptacle for a cooling medium; a dehydrating medium; a housing therefor; means for connecting removably said housing to said receptacle to form an air duct adapted to communicate with the interior of said housing; and means associated with said housing for controlling the circulation of air therethrough.

6. A device of the class described comprising, in combination, a receptacle for a cooling medium; a dehydrating medium; a housing therefor and connectable with said receptacle to form an air duct, said duct communicating with said housing; and means for controlling the circulation of air through said duct and housing.

7. A device of the class described comprising, in combination, means for cooling the air of a container; dehydrating means associated therewith; housings for said cooling and said dehydrating means and forming an air duct therebetween, said duct communicating with said dehydrating means; and means for controlling the circulation of air through said duct and dehydrating means.

8. Air conditioning means for containers comprising, in combination, means for cooling the air of a container; dehydrating means closely associated therewith; a housing for said dehydrating means; a housing for said cooling means and having means cooperable with said first mentioned housing to form an air duct adjacent said cooling and dehydrating means; and means for controlling the circulation of air currents induced by the relative position of said cooling and dehydrating means.

9. Air conditioning means for containers comprising, in combination, means for cooling the air of a container; air dehydrating means; housings for said cooling means and dehydrating means, said housings forming an air duct adjacent said cooling and dehydrating means; and means for controlling the passage of air through said duct.

10. Air conditioning means comprising, in combination, cooling means; dehydrating means closely associated therewith; and means for controlling the flow of air currents induced by the association of said cooling and dehydrating means.

11. Air conditioning means for containers comprising, in combination, a receptacle provided with a cooling medium; a housing containing dehydrating means; said cooling medium and dehydrating means being so associated with respect to each other that the air after passing the cooling medium is immediately brought into contact with the dehydrating means in a manner to produce accelerated movement of the air within a container.

12. Air conditioning means comprising, in combination, cooling means; and dehydrating means associated therewith, said cooling and dehydrating means being so positioned as to cooperate in a manner to induce accelerated circulation of air currents.

In testimony whereof, I have signed my name to this specification.

PAUL S. MOYER.